(12) United States Patent
Way et al.

(10) Patent No.: US 6,583,903 B1
(45) Date of Patent: Jun. 24, 2003

(54) METHOD AND SYSTEM FOR CONTROLLING POLARIZATION MODE DISPERSION

(75) Inventors: David G. Way, Garland, TX (US); Tiejun Xia, Richardson, TX (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/517,402

(22) Filed: Mar. 2, 2000

(51) Int. Cl.$^7$ .................. H04B 10/00; H04B 10/06
(52) U.S. Cl. ............... 359/156; 359/192; 359/110
(58) Field of Search ............... 359/110, 124, 359/156, 192

(56) References Cited

U.S. PATENT DOCUMENTS

| | | | | |
|---|---|---|---|---|
| 4,833,668 A | * | 5/1989 | Rowley ................... 370/1 |
| 4,856,093 A | * | 8/1989 | Mohr .................... 455/619 |
| 4,989,200 A | * | 1/1991 | Olshansky et al. .......... 370/3 |
| 5,124,828 A | * | 6/1992 | Mahon ................... 359/192 |
| 5,191,462 A | * | 3/1993 | Gitlin ................... 359/189 |
| 5,311,346 A | * | 5/1994 | Haas et al. .............. 359/156 |
| 5,473,457 A | * | 12/1995 | Ono .................... 359/161 |
| 5,793,511 A | * | 8/1998 | Bulow .................. 359/161 |
| 5,905,585 A | * | 5/1999 | Shirai .................. 359/110 |
| 5,926,297 A | * | 7/1999 | Ishikawa et al. .......... 359/115 |
| 5,930,414 A | * | 7/1999 | Fishman et al. ........... 385/11 |
| 5,936,753 A | * | 8/1999 | Ishikawa ................ 359/125 |
| 6,295,272 B1 | * | 9/2001 | Feldman et al. ........... 370/203 |
| 6,339,489 B1 | * | 1/2002 | Bruyere et al. ........... 359/156 |
| 6,396,606 B1 | * | 5/2002 | Mao .................... 359/110 |

* cited by examiner

Primary Examiner—Jason Chan
Assistant Examiner—Agustin Bello

(57) ABSTRACT

In an optical data communications link, a modulated optical signal is emitted from an optical transmitter, coupled into one end of an optical fiber, and received by an optical receiver at the opposite end of the fiber. The present invention relates to reducing the polarization-mode dispersion (PMD) of the modulated optical signal caused by the birefringence of the fiber, which tends to limit the usable bandwidth of the fiber. A polarization controller is applied to the modulated optical signal substantially near the transmitter. The receiver measures the quality of the received signal and issues commands to the polarization controller to improve the received signal quality.

In various embodiments, the signal quality measurement may be based on observed bit-error-rate (BER), estimated best attainable BER, or estimates of PMD affecting the received signal. Such measurements may be performed in the receiver by altering the threshold level and sampling timing of a bit detector in the receiver and monitoring the resulting changes in BER.

Polarization control from the receiver are preferably coupled to the polarization controller through the same optical fiber carrying the modulated optical signal.

21 Claims, 10 Drawing Sheets

METHOD AND SYSTEM FOR CONTROLLING POLARIZATION MODE DISPERSION

TECHNICAL FIELD

This invention relates generally to optical communication systems and, more particularly, to a method and system for actively reducing polarization mode dispersion along an optical communications link.

BACKGROUND

In a typical optical communications system, an optical signal in the form of a series of light pulses is emitted from an optical transmitter and coupled into an optical fiber through which the optical signal may propagate for hundreds of miles. The optical transmitter typically comprises a laser diode that is intensity modulated with a data signal so that the optical signal can transmit information over long distances through the fiber.

A sensitive receiver at the opposite end of the fiber can detect the pulses in the optical signal and reconstruct the data signal that was applied at the transmitter. The data signal may be, for example, a SONET-compliant STS-48 digital signal carrying data at a rate of about 2.5 gigabits-per-second. (SONET refers to the Synchronous Optical NETwork standards that define particular digital signal formats.) As this type of signal modulates an optical transmitter, a modulated optical signal called an OC-48 is formed comprising a train of closely spaced light pulses of very short duration. A single pulse for this type of signal has a duration of less than a billionth of a second. Other types of signals with several times the data rate of an OC-48 are becoming commonplace.

As these brief pulses propagate through a long optical fiber, a number of effects cause each of the pulses to spread out in the time domain. Without sufficient control of these effects, the pulses can even begin to overlap such that a receiver cannot distinguish one pulse from another and therefore cannot reliably reconstruct the transmitted signal. Many techniques have been developed for reducing or eliminating large-magnitude degradation effects that occur in optical fibers, such as multi-mode propagation and chromatic dispersion. But another form of dispersion is becoming a limiting factor in optical communication systems as progressively higher data rates are attempted.

Polarization mode dispersion (PMD) arises due to birefringence in the optical fiber. This means that different polarizations of light may propagate at slightly different speeds through a given optical fiber. A brief pulse of light may have a well defined on-off profile upon entry into an optical fiber. But, unless some control means are employed, the energy of the pulse will probably be partitioned into polarization components that travel at different speeds. As with chromatic dispersion, this speed difference causes pulse broadening and restricts the usable bandwidth of each modulated optical signal.

A modulated optical signal arriving at an optical receiver must be of sufficient quality to allow the receiver to clearly distinguish the on-and-off pattern of light pulses sent by the transmitter. Conventionally, a properly designed optical link can maintain a bit-error-rate (BER) of $10^{-13}$ or better. This means that, on average, one bit will be incorrectly communicated for every 10,000,000,000,000 bits sent. Noise, attenuation, and dispersion are a few of the impairments that can render an optical signal marginal or unusable at the receiver. Generally, when an optical channel degrades to a BER of $10^{-8}$, a communication system will automatically switch to an alternate optical channel in an attempt to improve the BER.

From the receive end of an optical transmission link, it is difficult to observe a signal and determine what effects are contributing to the degradation of the signal. Chromatic dispersion causes the spreading of pulses in much the same manner as polarization-mode dispersion. Fortunately, chromatic dispersion is relatively constant for a given fiber and can be measured or calculated when a fiber is initially installed and can be adequately compensated by static techniques.

Although PMD is a more subtle effect, PMD changes very dramatically as a fiber is moved about or subjected to physical stress or thermal changes. A fiber installed above ground can exhibit fairly rapid fluctuations in PMD due to temperature and mechanical forces. A fiber buried underground may be sensitive to loads such as street traffic or construction work. The state of polarization of a signal may be affected at any point along the fiber by such influences but the precise effect that will be experienced is practically unpredictable for a long fiber. Consequently, a fiber that is carrying a high data rate optical signal may present an acceptable path at one time and a severely degraded path at another time. Accordingly, there is a need to dynamically compensate PMD such that, as the propagation characteristics of a fiber change, some accommodation can be made to maintain an acceptable path for the optical signal. This can be especially difficult as the fiber must continue to carry traffic at all times. Traffic along the fiber can not be interrupted to allow for test signals to be applied to the fiber and for experiments to be performed.

Generally, for a given fiber at a given instant in time, it is possible to launch an optical signal with a particular state of polarization such that birefringent effects tend to be nearly eliminated. Polarization controllers are known in the art for changing the state of polarization of an optical signal. Although one may place a polarization controller at the point where an optical signal is launched into a given fiber, it is not known what polarization should be selected to best mitigate PMD through the fiber at any point in time. As an added challenge, a reliable means must be used for communicating to the polarization controller even when the PMD conditions along the fiber are extreme. This implies that a second communications link, separate from the given fiber, is preferable for signaling to the polarization controller. However, this approach adds cost and adds the control complexity of ensuring that the correct polarization controller is addressed from among many polarization controllers throughout the network.

In prior art optical communication systems, PMD changes are typically compensated for by a Polarization Mode Dispersion Compensator (PMDC) which detects the differential delay experienced by two polarizations of an optical carrier and then adaptively corrects the delay. A PMDC is generally a self-contained unit placed along an optical link just prior to a receiver. As polarization characteristics of the fiber change, the PMDC constantly monitors and adjusts the signal in an attempt to minimize the PMD contribution to overall dispersion. A typical PMD compensator splits an incoming modulated optical signal into two polarizations. The relative timing of the two modulated signal halves is then corrected by introducing a delay into one signal half and then recombining the halves to form a corrected output signal. This compensation technique has practical limitations to the range of PMD values that it can detect and correct.

An improved means is required for actively compensating PMD along an optical communications link. In particular, a method is required for directing a polarization controller to change the polarization of an optical signal so that the signal experiences reduced PMD as it propagates through an optical fiber. Furthermore, a means is required for detecting and compensating PMD regardless of the magnitude of the PMD.

SUMMARY

The present invention is directed to an optical communications link having improved control of PMD characteristics. The quality of a first optical signal received through a fiber is measured by a receiver. The resulting quality measurement is used to determine how to adjust a polarization controller to change the polarization of the first optical signal as it is transmitted into the fiber before reaching the receiver. A command signal to control the polarization controller is generated based upon the quality measurement and is coupled to the polarization controller to achieve an optimum polarization setting.

In accordance with a preferred embodiment, the command signal for the polarization controller is sent back along the same fiber through which the first optical signal is received.

In accordance with one exemplary embodiment of the present invention, the quality measurement is an observed bit-error-rate from the receiver.

In accordance with another exemplary embodiment of the present invention, the quality measurement is a theoretical best-attainable BER extrapolated from measurements at various settings of threshold and sampling time offset in the receiver.

In accordance with yet another exemplary embodiment of the present invention, the quality measurement is an assessment of PMD derived from measurements at various settings of threshold and sampling time offset in the receiver.

Various exemplary embodiments are also taught by which control signals from the receiver are coupled to the polarization controller. In accordance with a preferred embodiment of the present invention, the control signal is communicated in the form of low-level, low frequency modulation superimposed upon a second modulated optical signal. The second modulated optical signal travels along the same fiber that carries the first optical signal, but in a direction opposite to the first optical signal.

BRIEF DESCRIPTION OF THE DRAWINGS

A full understanding of the present invention, as well as additional features and advantages, is best provided by the following detailed description in conjunction with the accompanying drawings, wherein.

DETAILED DESCRIPTION OF THE PREFERRED EMBODIMENTS

A complete understanding of exemplary embodiments of the present invention will be facilitated by a brief introduction to some recently developed techniques for analyzing signal quality in an optical receiver.

Information to be carried over an optical communications link is usually presented as an electrical signal comprising a sequence of binary bits, often called a "bit stream." The bit stream is used to control an optical light source, usually a laser diode coupled into an optical fiber. The optical light source is made to turn on and off in response to the binary one's and zero's in the bit stream. In the time domain, the optical signal may be envisioned as being divided into narrow time slots. If light is present during one time slot, then the signal communicates a "one" value, otherwise the signal represents a "zero" value. The duration of each time slot in seconds is referred to as the "period" of the signal. The frequency, or "clock rate," of the signal expresses how many bit periods occur per second and is the reciprocal of the period of the signal.

Figure 1:
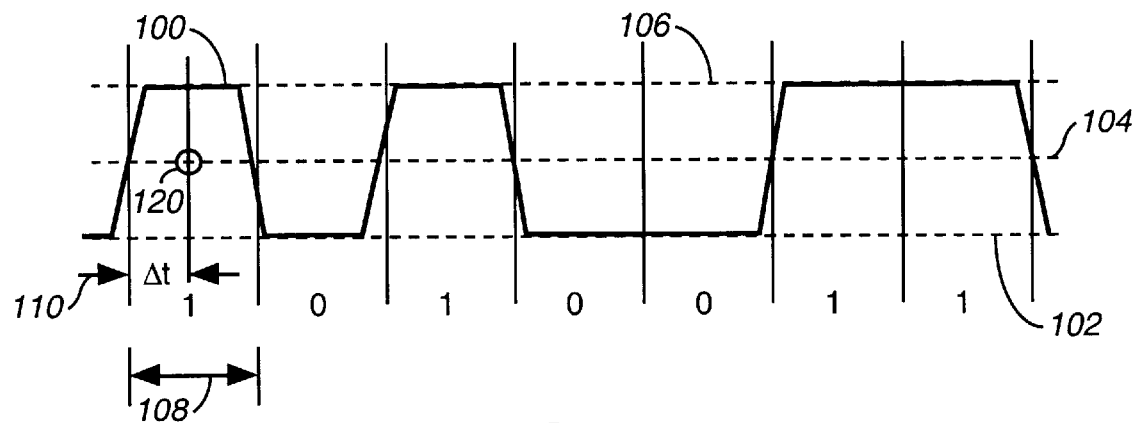
FIG. 1 is a graph of a serial data signal.

FIG. 1 of the accompanying drawings depicts an example portion of a bit stream comprising a bit sequence of "1010011". Signal 100 representing the bit stream may be an electrical signal or a corresponding intensity-modulated optical signal. In FIG. 1, the vertical axis represents instantaneous voltage value or light intensity, whereas the horizontal axis represents time. In FIG. 1, the horizontal axis is divided into evenly spaced time slots 108, each with a duration corresponding to the bit period of the bit stream. In the case of a SONET-compliant OC-48 optical signal, each time slot 108 is approximately 400 picoseconds in duration. Within each time slot, the signal conveys a binary state— either a one value or a zero value.

In FIG. 1, a low signal level corresponding to a nominal "zero" is depicted by zero level 102 and a high signal level corresponding to a nominal "one" is depicted by one level 106. A signal level approximately halfway between zero level 102 and one level 106 is depicted by an arbitrary threshold level 104. Threshold level 104 is used for comparison to signal 100 to determine at any instant whether signal 100 indicates a "one" or a "zero."

Within each time slot 108, the high or low status of signal 100 is readily distinguishable as being above or below threshold level 104. Except for the brief times of transition between these two states, the signal level is similar either to the nominal zero level 102 or to the nominal one level 106. Thus, FIG. 1 depicts a signal that has undergone no significant degradation and may be reliably detected by an optical receiver.

As is well understood by those of skill in the art, a receiver can recover the bit sequence from signal 100 by synchronizing with the clock rate of the signal, sampling the signal level at some point in time within each time slot, and comparing the sampled signal level to a threshold level. If, at the instant that the signal is sampled, the signal level exceeds the threshold, the value of the signal is interpreted as a 'one' for the given time slot. Otherwise, the value is taken to be a 'zero'. This process is repeated for each time slot and the receiver thus renders a series of one's and zero's as output.

In FIG. 1, sampling time offset 110 represents the time delay of the instant of sampling each bit relative to the beginning of each time slot 108. The threshold level 106 and the time offset 110 of the sampling instant within each time slot are usually adjusted to achieve best reception of a given signal. A shown in FIG. 1, the combination of a particular sampling time offset 110 and threshold level 106 define a setpoint 120 for a given detector.

Figure 4:
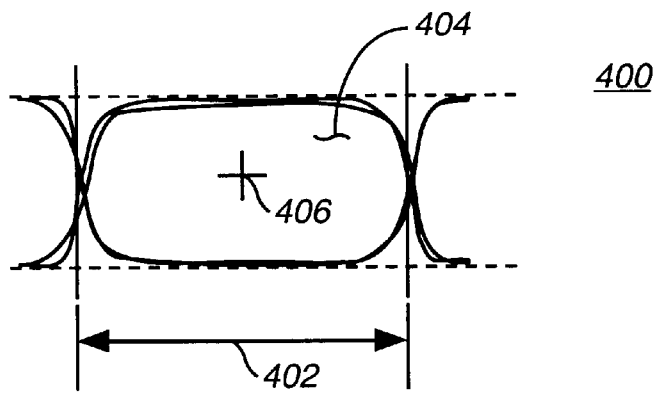
FIG. 4 is an "eye diagram" plot of the data signal of FIG. 1.

One common method of analyzing the quality of a serial digital signal is the so-called "eye diagram." FIG. 4 shows an example "eye diagram" 400 corresponding to signal 100 of FIG. 1. An eye diagram is formed by overlaying successive frames of time-domain traces of the signal, with the time duration of each frame corresponding to one bit period of the signal. This view of a digital signal is often used for adjusting transmission equipment in the electrical domain because it can be readily observed using an oscilloscope without having to decode any of the data content of the signal.

In FIG. 4, a single bit period is depicted by the bit period interval 402 and successive traces of signal 100 are overlaid upon one another to define what is visually perceived as an enclosed region 404. In the time axis, region 404 is bound on either side by the transitional leading and trailing edges of the pulses of signal 100.

In interpreting such eye diagrams, it may generally be said that the more open space that is visible in enclosed region 404 of the eye diagram, the better the signal quality and hence the more reliably the signal may be received and accurately reproduced as one's and zero's. Time domain impairments such as timing jitter and chromatic dispersion will tend to constrict the width of region 404. Noise added to signal 100 would appear as general "fuzziness" of the lines defining region 404. Sufficient impairments in combination can even obliterate the appearance of region 404, representing an unusable signal in that "ones" and "zeros" are no longer distinguishable. Varying degrees of such impairments are evident in the eye diagrams of FIG. 5 and FIG. 6.

To provide an even clearer explanation of the significance of the eye diagram, it is useful to superimpose a receiver setpoint 406 on eye diagram 400 to illustrate the sampling time offset and threshold level currently used by a given receiver. The optimum placement of setpoint 406 within region 404 is usually in the very center of the region 404. This selection of a sampling point makes the receiver as robust as possible towards noise, pulse dispersion, and timing jitter, although these effects are not particularly evident in eye diagram 400.

Figure 2:
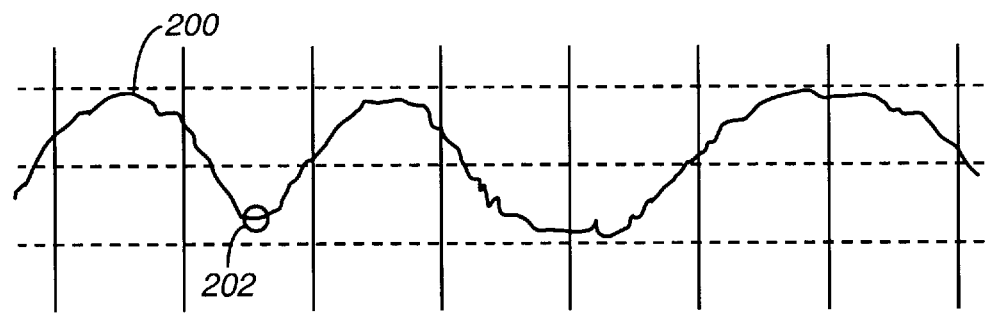
FIG. 2 is a graph of a serial data signal having experienced moderate degradation.

FIG. 2 depicts a modulated optical signal 200, or its electrical equivalent, similar to signal 100 but suffering degradation due to pulse dispersion and noise. It can be seen that the pulses are rounded into a roughly Gaussian shape and that the gradual leading and trailing edges of these diffuse pulses cause some light to be present even when a zero level is supposed to be transmitted. This "leakage" is evident in the vicinity of point 202 of FIG. 2.

Figure 5:
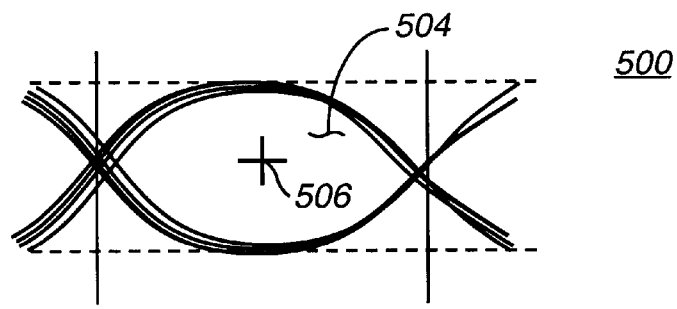
FIG. 5 is an "eye diagram" plot of the moderately degraded data signal of FIG. 2.

An eye diagram 500 corresponding to signal 200 is shown in FIG. 5. The noise and pulse spreading observed in signal 200 are generally evident in FIG. 5 as a reduced size of center region 504. The reduced height of region 504 is due to noise and to the previously mentioned overlap of ones pulses into adjacent zero bit time slots. The reduced width of enclosed region 504 is also attributable to the pulses spreading and overlapping into one another in the time axis. An optimum detector setpoint 506 is approximately centered within region 504, but the margin around the setpoint is reduced compared to FIG. 4, indicating a somewhat increased bit error rate.

Figure 3:
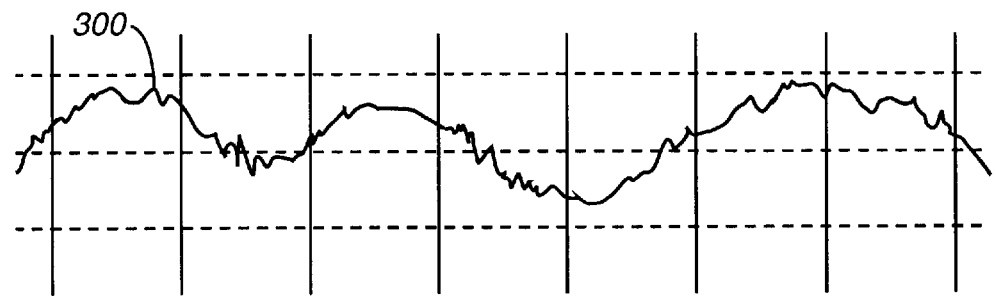
FIG. 3 is a graph os a serial data signal having experienced severe degradation.
Figure 6:
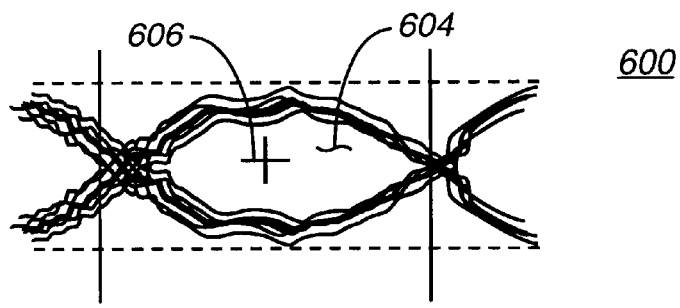
FIG. 6 is an "eye diagram" plot of the severely degraded data signal if FIG. 3.

FIG. 3 depicts a severely degraded signal 300 that would be difficult to receive and would exhibit a high BER. FIG. 6 is the eye diagram corresponding to signal 300. Region 604 is substantially reduced in size due to noise and other impairments. Note that the optimum setpoint 606 under these conditions is somewhat shifted compared to FIG. 1 and FIG. 2. As noise and dispersion increase, the placement of the threshold point becomes more critical. The signal can degrade to the point that even the best possible setpoint results in an unacceptable BER.

As mentioned earlier, the threshold level and sampling timing of a receiver are often fine-tuned to minimize BER. BER is inherently measured in the course of receiving and performing forward error correction in a SONET optical link. It is possible, then, to observe the BER of a given receiver and fine tune its sampling point accordingly. U.S. Pat. No. 5,896,391 issued to Solheim, et al., describes the construction and operation of a receiver that performs in this manner. Even given this technique, it is undesirable to jeopardize the BER of an active traffic-bearing optical link by making dramatic shifts in threshold level and sampling timing.

Recently, an optical receiver technique has been developed wherein a pair of similar detector circuits process the same raw input signal. One detector is designated as the main detector and is an essential element through which live traffic is carried through the network. The other detector is an auxiliary detector that is used to experiment with different settings of threshold and sampling time offset. Usually the auxiliary detector is used to probe various settings and determine an optimum setting to which the main detector should be set.

One advantage to the dual detector approach is that the auxiliary detector may radically vary its threshold and sampling timing without affecting the live traffic handled by the main detector. The auxiliary detector may map out the combinations of thresholds and sampling times that give rise to significant bit error rates. Furthermore, by varying either threshold or sampling time, a curve can be plotted to extrapolate the ultimate attainable BER for a given optical path. This extrapolation has practical importance because, as BER is reduced to extremely low values, such as $10^{-13}$ or below, the measurement time required to observe even a single bit error may be prolonged to hours, days, or weeks. Furthermore, as the BER falls to such values, the occurrence of a bit error becomes probabilistic and measurements become inaccurate. At an extremely low BER of $10^{-15}$, it is statistically possible for the next bit error to occur within the first minute of observation, leading to a perception that the BER is orders of magnitude higher than it really is.

By plotting BER as a function of threshold or sampling timing, and only measuring at BER values that yield a statistically significant number of bit errors in a reasonably short period of time, it is possible to extrapolate the best attainable BER in a reasonable short period of time, even when the best attainable BER is beyond $10^{-13}$.

Figure 7:
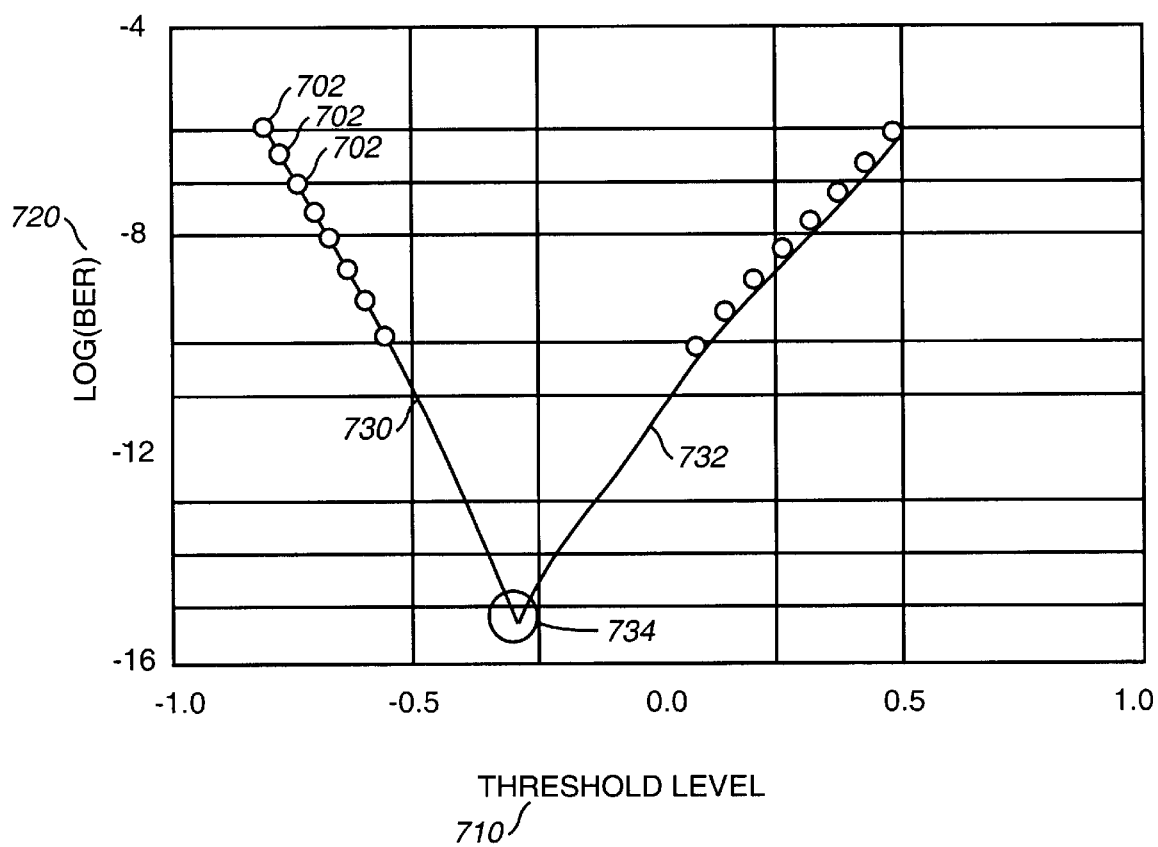
FIG. 7 is a graph depicting how bit error rate may be plotted as a function of threshold level for a given detector.

FIG. 7 depicts how BER values may be analyzed to estimate best attainable BER in a short period of time. In graph 700, the ordinate 710 is relative threshold level and the abscissa 720 is the logarithm of the BER. Although FIG. 7 depicts BER plotted versus threshold, a similar plot may be obtained by plotting BER as a function of sampling timing offset.

Each data point 702 is determined by adjusting the threshold until a particular BER is achieved and then plotting the threshold level against the logarithm of the BER. To assure timely measurements, it is preferable to take measurements with BER values of between $10^{-5}$ and $10^{-10}$.

As shown in FIG. 7, as the threshold level is varied towards a low extreme, the data points map out a roughly linear low threshold performance curve 730. As the threshold level is varied towards the opposite extreme, a high threshold performance curve 732 is also defined. Both of these curves may be extrapolated into the region of extremely low BER, a region where empirical measurements may be impractical or unreliable. At intersection 734 of curve 732 and curve 734, the abscissa indicates the best achievable BER as a compromise between the extreme values of the decision level.

In the dual detector configuration mentioned earlier, it is possible to adapt the auxiliary receiver to automatically perform the analysis depicted in FIG. 7 by varying the auxiliary threshold and auxiliary sampling time offset and observing the BER from the auxiliary detector. By the process described above, the data so obtained can be extrapolated to estimate a best achievable BER.

Figure 8:
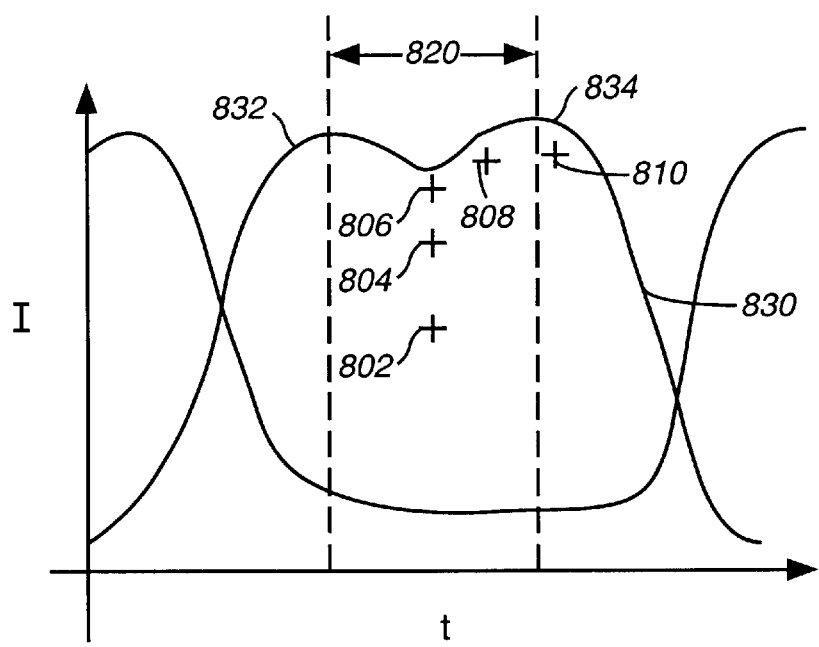
FIG. 8 is an "eye diagram" plot of a data signal that has been partitioned into two polarization components of approximately equal energy and has subsequently been affected by polarization-mode dispersion.

Given the ability to freely alter auxiliary detector threshold and sampling timing, an even more detailed technique is possible for analyzing receive signal quality. The approximate average shape of the enclosed region in an eye diagram may be determined by simultaneously varying both detector threshold and sampling timing as depicted in FIG. 8. The bounds of the enclosed region can be probed because the BER will rise sharply as the setpoint approaches the limits of the enclosed region. Thus, in FIG. 8, sampling point 802 will experience a relatively low BER and sampling points 804 and 806 will yield progressively higher BER. Furthermore, sampling points 808 and 810 will exhibit roughly the same BER as sampling point 806 because they have roughly the same proximity to the boundaries of the enclosed region. Many such sampling points yielding similar BER can be determined by coordinated control of both threshold and sampling timing. An adequate collection of such points can therefore describe the shape of the enclosed region or be used to trace an averaged pulse shape.

Figure 9:
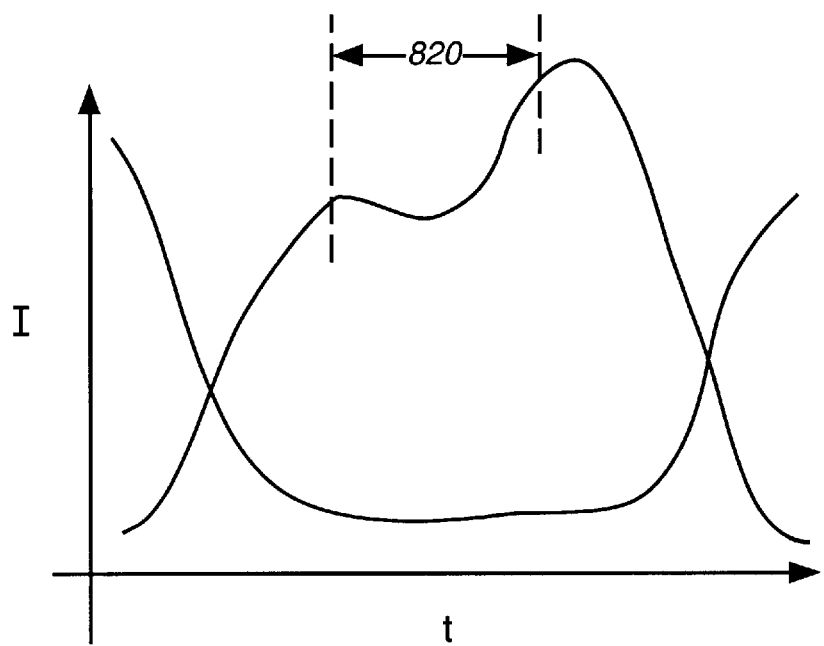
FIG. 9 is an "eye diagram" plot of a data signal, the energy of which has been unevenly partitioned into two polarization components and affected by polarization-mode dispersion.

It has recently been observed that a pulsed signal affected by PMD results in characteristic pulse shapes observable in an eye diagram. FIG. 8 and FIG. 9 depict a pair of eye diagrams wherein the pulsed signal has undergone PMD. In fact, the PMD value is approximately the same for both FIG. 8 and FIG. 9, despite the difference in appearance of the respective eye diagrams. As described earlier, the energy of a given pulse will often be partitioned into two polarization states that travel at different speeds. With sufficient PMD, a single transmitted pulse may arrive at a receiver as two overlapping yet distinguishable pulses. In FIG. 8, a trace 830 appears to be a composite of two component pulses, a first component pulse 832 and a second component pulse 834. PMD may be directly determined by measuring the time delay 820 between first component pulse 832 and second component pulse 834.

The relative amplitude of the distinguishable pulses is a function of how much of the pulse energy is partitioned into each of two orthogonal polarizations. When equal parts of the pulse energy enter each polarization, the received pulses have approximately the same amplitude as can be seen in FIG. 8.

When the pulse energy is more coupled into one polarization than the other, the eye diagram more closely resembles FIG. 9. Even though the amplitudes of the components are unequal in FIG. 9, two pulse components can still be distinguished and a time difference can be estimated.

Of course, it is possible that essentially all of the energy of a pulse may happen to be channeled into one polarization whereupon only a singular pulse will be apparent at the receiver. PMD cannot be measured under this condition and is, for practical purposes, non-existent because only a single polarization is being propagated. Intentionally attaining this condition by careful control of transmitted polarization state is precisely what is desired in practicing the present invention.

Accordingly, in another exemplary embodiment of the present invention, the auxiliary detector in a dual detector receiver configuration is used to determine the average shape of a received waveform. If two component pulses can be discerned in the eye diagram of a signal, then a polarization controller is adjusted to minimize one component and maximize the other. This accomplishes elimination of PMD without having to apply adjustable delay elements to either polarization. Various algorithms and mathematical pattern detection methods are known by those skilled in the art for analyzing a waveform and detecting the presence of multiple pulse components.

Figure 10:
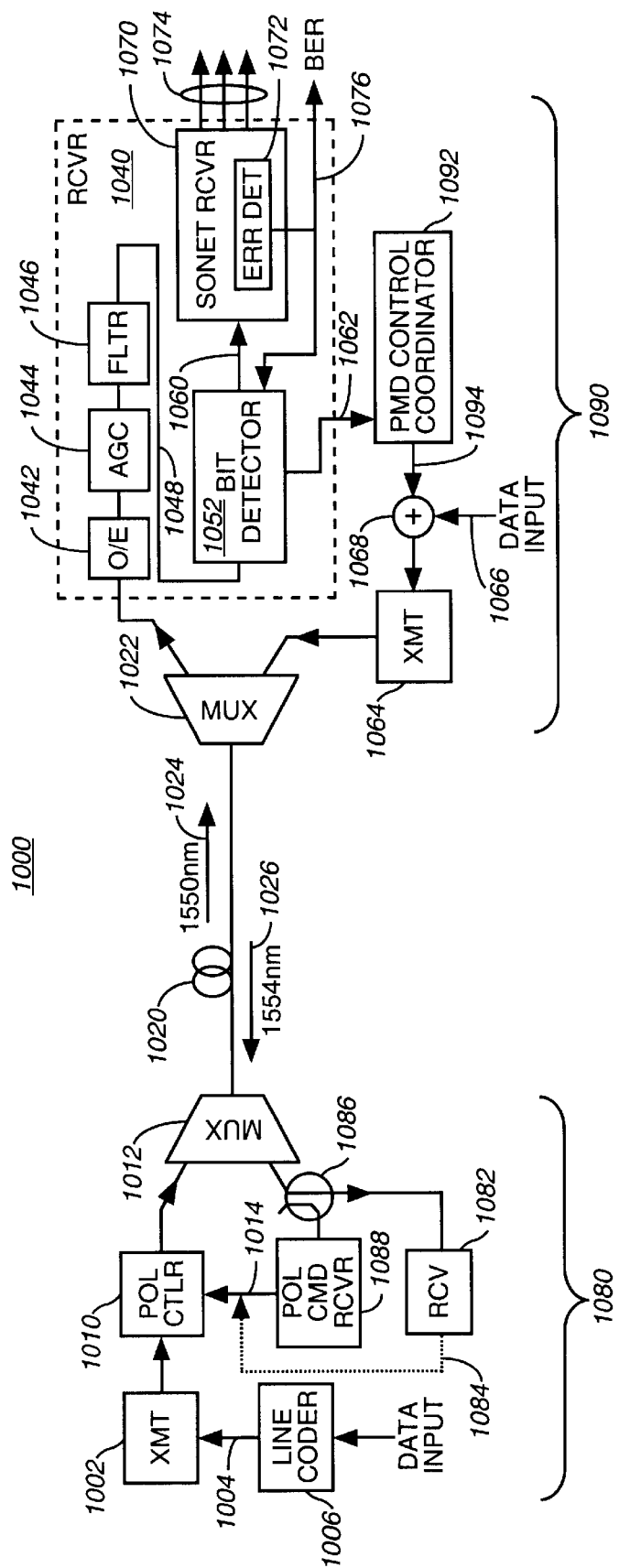
FIG. 10 is a diagram of an optical communications link in accordance with a preferred embodiment of the present invention.

FIG. 10 shows an optical communications link 1000 as an exemplary embodiment of the present invention. An optical fiber 1020 is used to conduct data-carrying optical signals between first site 1080 and second site 1090. Optical fiber 1020 is typically tens or hundreds of miles in length and may also comprise line amplifiers and signal regenerators which are not shown in FIG. 10.

At first site 1080, an optical transmitter 1002, usually comprising a laser diode, produces a forward optical signal 1024 at a specific wavelength, for example at 1550 nm. Forward optical signal 1024 is intensity modulated by a digital bit stream incident along data input 1004. Line coding or scrambling at a line coder 1006 is often applied to the data signal prior to data input 1004 so that ones and zeros in the transmitted signal are always sufficiently interspersed in the transmitted signal. This is done for a variety of practical reasons, one reason being so that downstream clock recovery circuits can stay in synchronization with the signal even when the data to be transmitted comprises a long string of zeros. Optical signal 1024 is coupled to optical fiber 1020 through polarization controller 1010 and wavelength multiplexor 1012. Wavelength multiplexor 1012 is well known in the art and may be an optical grating or other device that accomplishes separation of optical signals on the basis of wavelength. Wavelength multiplexor 1012 may be used to couple signals both into and out of optical fiber 1020.

Polarization controller 1010 affects the polarization state of the optical signal being coupled into fiber 1020 from transmitter 1002. In accordance with the present invention, polarization controller 1010 is responsive to command signals provided at polarization control input 1014. The source of these polarization command signals is described below.

At site 1090, forward optical signal 1024 is received through fiber 1020 and coupled into a receiver 1040 through wavelength multiplexor 1022. It is well known in the art that numerous sets of transmitters and receivers, each set operating at a distinct wavelength, may be coupled through fiber 1020 to accomplish what is called "wavelength division multiplexing" or WDM. When such as technique is implemented, wavelength multiplexors 1012 and 1022 serve to separate the wavelengths and selectively route the optical signals to their respective transmitters and receivers. Those of skill in the art will recognize that there are alternate techniques for accomplishing WDM. For instance, signals from several transmitters may be coupled to a single fiber through simple fiber splices. At a receive end of a fiber, multiple optical carriers at different wavelengths may be detected by a group of receivers by placing a wavelength-selective optical filter before each receiver. Wavelength multiplexors are often used for both transmit-end combining and receive-end separation for simplicity, especially when WDM signals are propagated in both directions through a given fiber.

At second site 1090 in FIG. 10, a common receiver front end is shown within receiver 1040 comprising an optical/electrical transducer (O/E) 1042, and automatic gain control (AGC) amplifier 1044 and a filter/equalizer 1046. Optical/electrical transducer 1042 is typically an avalanche photodiode or similar device that renders an electrical signal that varies in response to incoming optical signals. AGC amplifier 1044 amplifies the electrical signal from O/E transducer 1042. Depending on the peak-to-peak amplitude of the electrical signal from O/E transducer 1042,.AGC amplifier 1044 varies the amplification applied to the electrical signal in order to maintain a constant signal level to subsequent detector circuitry. Filter/equalizer 1046 performs frequency response modification and delay equalization to compensate for imperfections in the signal path and improve selectivity to the high-data rate modulation signal.

At linear channel output 1048, the modulation signal recovered and amplified in receiver front end 1024 is coupled as an electrical signal into bit detector 1050. The apparatus and operation of bit detector 1050 is described in greater detail below. In general, bit detector 1050 analyzes linear channel output 1048 and reconstructs a digital bit stream as output along data output 1060. Ideally, the reconstructed bit stream at data output 1060 is identical to the bit stream presented at data input 1004 to transmitter 1002.

Next, the reconstructed bit stream at data output 1060 is provided to a SONET data receiver 1070 that interprets and parses the frames of data and provides output data streams in desired formats along output lines 1074. These outputs are often tributary data streams of lesser data rates than the composite SONET signal that was optically transmitted. SONET data receiver 1070 may also de-scramble or otherwise reverse the effects of any line coding that may have been applied to the data signal prior to input at data input 1004.

A forward error correction mechanism is provided within SONET systems, for which error detector 1072 is shown as part of SONET data receiver 1070. Error detector 1072 constantly generates a BER output 1076 indicating the most recent count of bit errors observed over a given interval of time.

Figure 11:
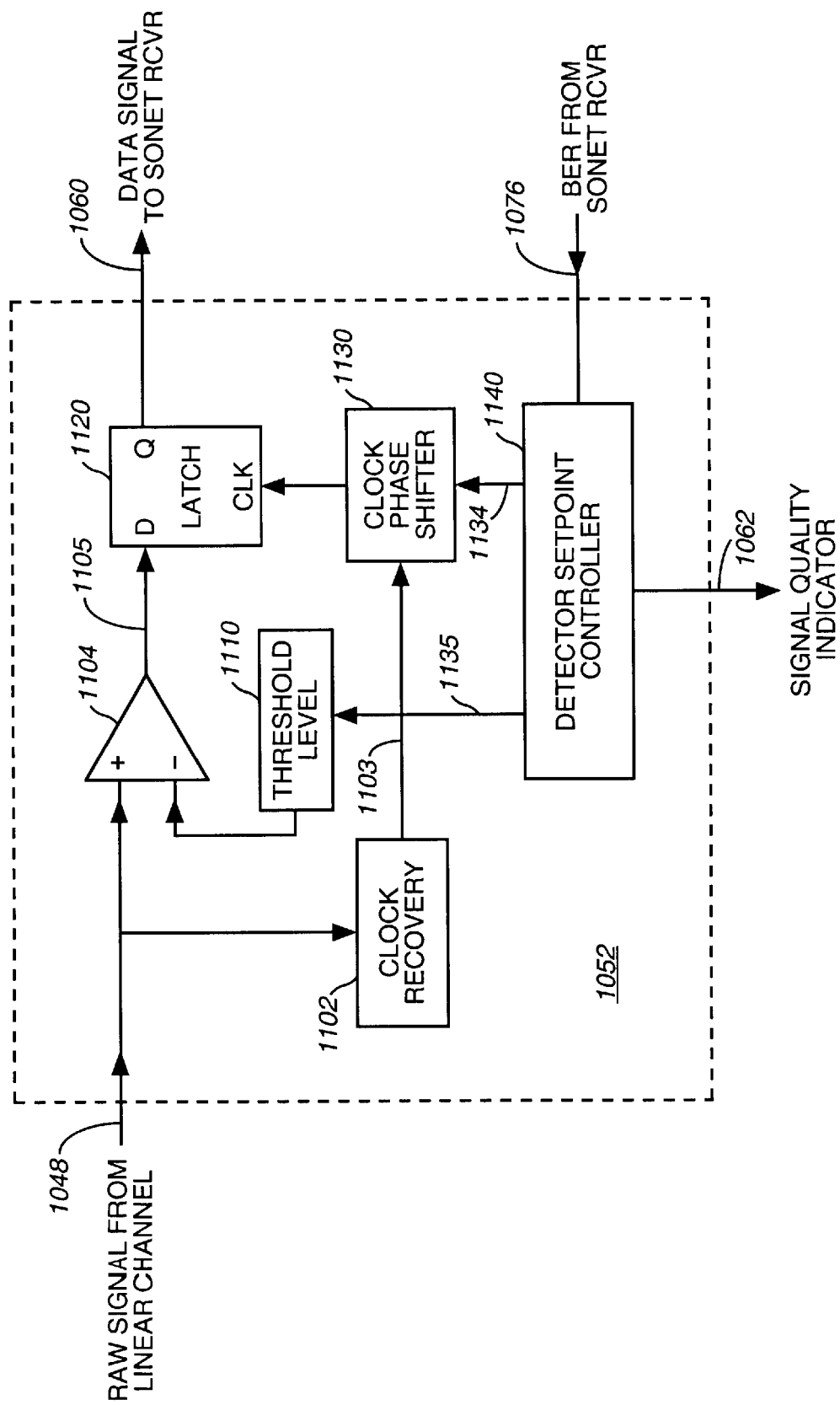
FIG. 11 is a diagram of a bit detector for use within a serial data receiver.
Figure 12:
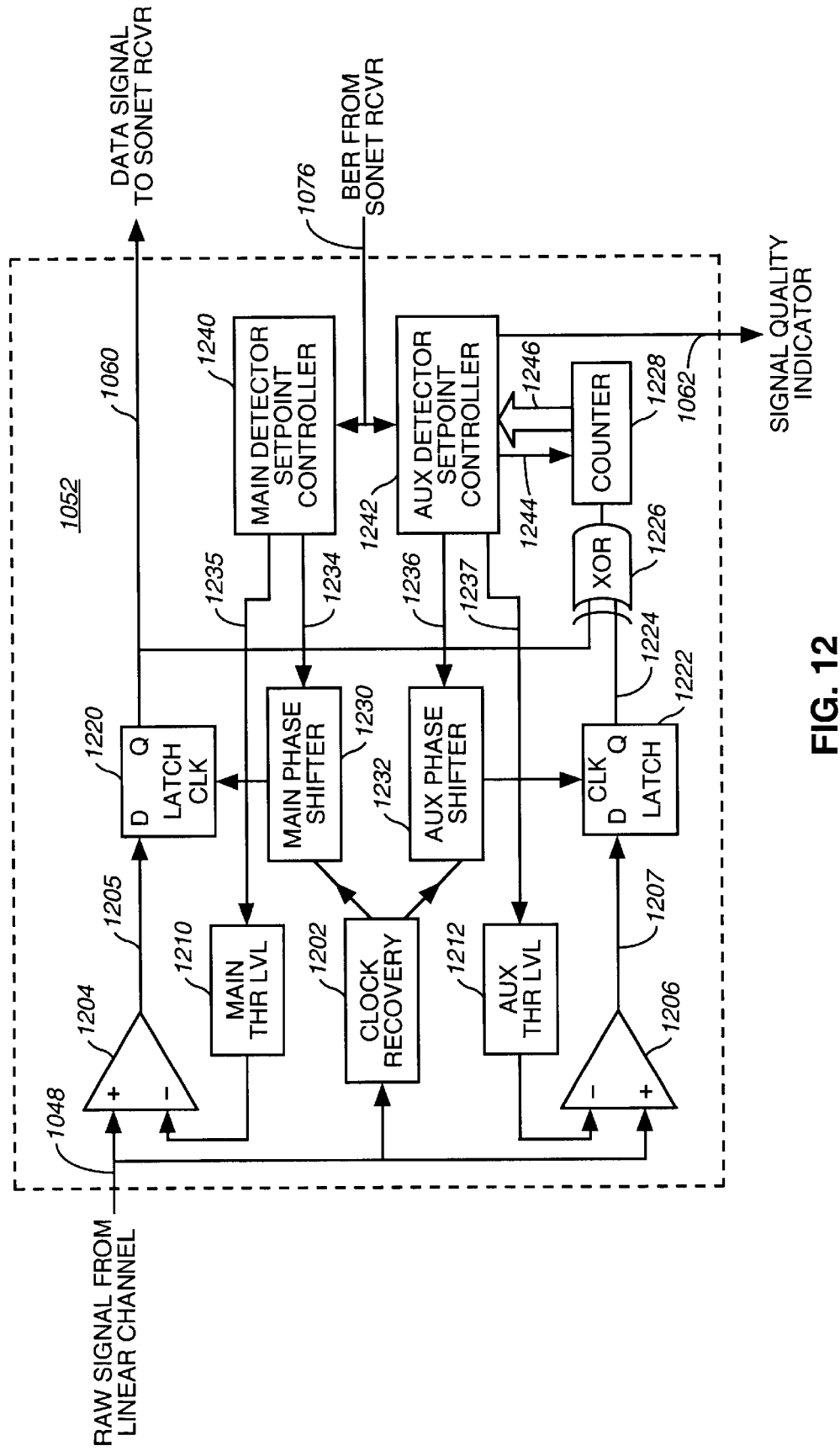
FIG. 12 is a diagram of a dual detector arrangement for use within a serial data receiver.

Receiver 1040 provides at least one signal quality output 1062 indicative of the quality of the modulated signal received along fiber 1020. FIGS. 11 and 12, described later, depict variations upon the operation of bit detector 1050 and corresponding variations upon how signal quality output 1062 may be derived.

Signal quality output 1062 is coupled to a PMD control coordinator 1092 which analyzes the signal quality indication and decides when and how polarization controller 1010 must alter the polarization of optical signal 1024 as it is coupled into fiber 1020 at site 1080. PMD control coordinator 1092 produces a polarization control command signal 1094 that! directs changes in settings of polarization controller 1010. Various means may be used to communicate polarization control commands from PMD control coordinator 1092 to distant polarization controller 1010.

In accordance with a preferred embodiment of the present invention, such polarization control commands are communicated "upstream" using a reverse optical signal 1026. Reverse optical signal 1026, preferably of a different wavelength than forward optical signal 1024, may be coupled to propagate from second site 1090 to first site 1080. As with forward optical signal 1022, reverse optical signal 1026 may be a SONET-modulated optical signal carrying live communications traffic.

In FIG. 10, an optical transmitter 1064 is shown at second site 1090 with its output at 1554 nm coupled into fiber 1020 through wavelength multiplexor 1022. A corresponding receiver 1082 at first site 1080 is, by virtue of wavelength multiplexor 1012 or other means, selectively receptive to reverse optical signal 1026.

In the case that reverse optical signal 1026 is a traffic-bearing high-data rate signal, it is possible for polarization control command signal 1094 to be encoded as data and sent as a part of the high data rate bit stream that is used to modulate transmitter 1064. For example, it is well known to "borrow" select bits in the SONET protocol to perform low data rate communications for network management, signaling and service channel usage. With this approach, polarization control command signal 1094 maybe recovered at receiver 1082 and provided through optional connection 1084 to control input 1014 of polarization controller 1010 to complete the control loop. While this practice may be acceptable in many situations, it may not work well in long fiber links where PMD can reach high levels. If fiber 1020 provides a severely degraded optical path, by exhibiting excessive PMD for example, then polarization control commands cannot be reliably received at first site 1080 and PMD of forward optical signal 1024 cannot be corrected.

At first, it would seem desirable to provide alternate communications channels for the polarization control commands, such as separate electrical, optical, or radio signals propagated apart from the path of forward optical signal 1024. However, there is a desire to keep the command signal and the controlled forward optical signal within the same fiber, or within the same span comprising a group of fibers.

The advantage of maintaining a common path is in simplifying the task of assuring that each receiver is controlling the correct remote polarization controller. In a network comprising perhaps many such receivers and polarization controllers, it is essential that polarization control commands be properly routed between corresponding pairs of receivers and polarization controllers. This task can be complicated and prone to mistakes if the controlled forward optical signal and polarization control commands are communicated through entirely separate means. Furthermore, the failure or mishandling of a separately routed command path could lead to PMD-related malfunction of an optical path, even when the optical path is otherwise functional. If, on the contrary, the controlled signal and command signal are both sent along the fiber, the failure of the fiber optical path affects the command signal only at a time when the controlled signal cannot be propagated anyway and PMD control becomes moot.

Therefore, a robust means is desired for transmitting polarization control commands despite severe degradation along an optical path. In accordance with a preferred embodiment of the present invention, an alternate approach is employed for carrying the polarization control command signal as a subcarrier upon reverse optical signal 1026.

As described in U.S. Pat. No. 5,956,165 issued to Fee et al., it is possible to superimpose a low-amplitude, low frequency subcarrier signal upon a high-data-rate digital signal that is used to modulate an optical carrier. The amplitude of the subcarrier may be 10% or less of the amplitude of the high data rate signal and may be substantially lower in frequency as well. The frequency or clock rate of the subcarrier may be on the order of kilohertz or megahertz. The combination of low-amplitude and low frequency ensures that the subcarrier does not interfere with the reception of the high-data-rate signal. Furthermore, the subcarrier may be received by inexpensive low-bandwidth optical sensors without having to transduce or decipher any of the high-data-rate modulation. Although the effective bandwidth of such a subcarrier channel is limited, it is more than adequate for accomplishing PMD control. By virtue of the low data rate, the subcarrier transmission channel is also very tolerant of PMD and other degradations along fiber 1020.

In accordance with an alternate exemplary embodiment, reverse optical signal 1026 does not carry high data rate modulation but is instead dedicated to carrying polarization control commands and other network management functions at substantially lower bandwidth. Operation at sufficiently low bandwidth makes reverse optical signal 1026 inherently more tolerant of PMD and other transmission impairments in fiber 1020.

In accordance with a preferred embodiment of the present invention, FIG. 10 depicts how a superimposed subcarrier modulation signal is used for carrying polarization control commands back to polarization controller 1010. Optical transmitter 1064 at second site 1090 is modulated by high speed data traffic presented at input 1066 that is to be transmitted to first site 1080. Polarization control commands from PMD control coordinator 1092 are coupled as a low-amplitude subcarrier signal that is simply added, via summing point 1068, to the modulation input of optical transmitter 1068. The resulting reverse optical signal 1026 propagates through fiber 1020 and eventually arrives at receiver 1082 at first site 1080.

Near receiver 1082, a portion of reverse optical signal 1026 is tapped off by an optical coupler 1086 and sent to polarization command receiver 1088. Polarization command receiver 1088 comprises a low bandwidth optical/electrical transducer (a photodetector), an amplifier, a low-pass filter, and a subcarrier data recovery circuit. The recovered polarization control commands by receiver 1088 are coupled to command input 1014 of polarization controller 1010.

Those of skill in the art will appreciate that many variations are possible in the form of the polarization control commands and the manner of conveying them through the subcarrier channel. For example, the polarization control command signals may be digital messages with a fairly rich, flexible format, or simply, a binary representation of a scalar value to which the polarization controller can react. The superimposed subcarrier may convey such data using a simple asynchronous serial data signal directly modulating the carrier or by first converting the serial data to a frequency shift keyed (FSK) representation.

Alternately, the PMD control coordinator may provide an analog signal, such as a voltage value, representing the correction signal for controlling the remote polarization controller. The subcarrier channel may be modulated in terms of frequency, phase, duty cycle, or the like, corresponding to the analog correction signal. Otherwise, the polarization control signal may be converted to a digital representation for transmission over the subcarrier using the aforementioned techniques and then be reconverted to an analog signal as needed by the polarization controller.

The present invention is not limited to any particular variation or combination of the above examples and a person of ordinary skill in the art may readily construct a satisfactory subcarrier channel for carrying polarization control commands without undue experimentation. The choice of subcarrier modulation format is simply a matter of convenience and practical engineering considerations.

Referring now to FIG. 11, one possible design is shown for the bit detector 1052 that was briefly introduced in FIG. 10. The purpose of bit detector 1052 is to analyze a raw analog, signal of coarsely defined pulses and render a corresponding bit stream exhibiting well defined on-off states, fast transitions between states and very accurate timing of the state transitions. For instructional purposes, it is useful to refer to the accompanying drawings and explain that bit detector 1052 must interpret a signal similar to FIG. 2 and render a signal similar to FIG. 1.

In FIG. 11, a raw electrical input signal is coupled to bit detector 1052 from linear channel output 1048. The raw electrical signal is coupled to the non-inverting input of a voltage comparator 1104 and to a clock recovery circuit 1102.

Voltage comparator 1104 constantly compares the voltage values at its two inputs, and outputs either a distinct high voltage or low voltage depending on the come of the comparison. If the non-inverting (+) input is greater than the inverting (−) input, then the output of comparator 1104 is at a high voltage level or high logic level. Otherwise, the output of comparator 1104 is at a low voltage level or low logic level.

A threshold voltage is applied to the inverting input of comparator 1104 from an adjustable stored threshold level 1110. This threshold level input is analogous to threshold level 104 introduced in FIG. 1. By comparing the raw electrical input signal to adjustable stored threshold level 1110, voltage comparator 1104 decides at any moment whether the input signal is more likely a 1 logic level or a 0 logic level. Accordingly, comparator output 1105 of comparator 1104 changes between a distinct 1 or 0 logic level in response to the comparison of the two input signals.

Comparator output 115 is coupled to the input of a binary latch 1120, such as an edge-triggered 'D' flip-flop. Latch 1120 operates by maintaining fixed state at its output, designated 'Q', for as long as the clock input is held in a fixed logic state. That is, while the clock input is held at a fixed state, the output 'Q' of latch 1120 is held constant regardless of changes in logic state at input 'D'. At the instant that the clock input undergoes a state transition, the state of the output 'Q' adopts the same logic state present at input 'D' at the instant of the transition.

This function by latch 1120 allows for precise control of the instance at which the decision of comparator 1104 can affect the output state of bit detector 1052 as sent forth along output 1060. The process for deriving the timing signal that controls the latching behavior of latch 1120 through its clock input is explained next.

Clock recovery circuit 1102 analyzes the raw electrical input signal from linear channel output 1048 and generates a constant stream of alternating pulses having precisely the same clock rate as the input signal. The recovered clock signal 1103 output by clock recovery circuit 1102 always comprises alternating 1's and 0's in synchronization with the bit time slots of the input signal. Recovered clock output 1103 always has a bit transition at each bit time slot, even if the input signal does not. Recovered clock output 1103 is used for synchronizing the sampling of each bit in the input signal and for maintaining this synchronization even when the input signal comprises a prolonged run of either 1's or 0's.

As is well known in the art, clock recovery circuit 1102 typically comprises a voltage controlled oscillator set up in a phase-locked loop with the input signal. The frequency of the oscillator is automatically adjusted to minimize phase mismatch between its output and that of the input signal. During times when the input signal is momentarily absent of state transitions, the oscillator continues to operate at a constant frequency and thus preserves the synchronization.

The state transitions of recovered clock output 1103 occur in exact synchrony with the bit time slots of the input signal. Because the determination of the logic state of the input signal should be made substantially between such transitions, the recovered clock output 1103 cannot be used as is to trigger the latching of latch 1120. Doing so would cause the logic state evaluation to occur exactly during bit transitions in the input signal, giving rise to mostly random signal output.

Recovered clock signal 1103 is processed through a clock phase shifter 1130 which introduces a delay or phase shift in the recovered clock signal before it is used to trigger the clock input of latch 1120. The amount of delay introduced by clock phase shifter 1130 is variable, allowing the timing of the determination of the input logic state to be freely adjusted within the bit time slot of the input signal.

Both the adjustable stored threshold level 1110 and the clock phase shifter 1130 may be controlled by a detector setpoint controller 1140. The threshold voltage level stored by adjustable stored threshold level 1110 is set through control linkage 1135. The delay introduced by clock phase shifter 1130 is set through control linkage 1134.

Via these control links, detector setpoint controller 1140 may coordinate the threshold level and sampling timing of bit detector 1052. Through BER output 1076, detector setpoint controller 1140 also receives bit error information from SONET receiver 1070 that may be taken into account in deciding an optimum detector setpoint.

Finally, detector setpoint controller 1140 assesses the quality of the input signal and provides a signal quality indicator 1062 as output. Signal quality indicator 1062 may simply default to being the same as BER output 1076, particularly when BER is high. Signal quality indicator 1062 may also be an estimate of best achievable bit error rate when BER is low.

The function of detector setpoint controller 1140 may be implemented in a variety of ways, for example, as a software or firmware-controlled microprocessor that has a data input connection to the.SONET receiver's BER output 1076 and has output connections to signal quality indicator 1062 and control linkages 1134 and 1135. The software or firmware controlling the microprocessor would implement the process steps described below in conjunction with FIGS. 13, 14 and 15. PMD control coordinator 1092 may likewise be implemented as a software-controlled processor and may even be integrated as a function within the same processor that implements detector setpoint controller 1140.

Adjustable stored threshold level 1110 may be implemented using a parallel data latch or shift register in conjunction with a digital-to-analog (D/A) converter. The former latch or register would hold the set of binary bits most recently sent along control linkage 1135 and the latter D/A converter would provide a threshold voltage output in proportion to the value of the set of binary bits held. A similar method for persistent storage of a sampling timing setting is envisioned for operating phase shifter 1130 through control linkage 1134, although phase shifter 1140 may be implemented in an entirely digital design. Those of ordinary skill in the art may readily fashion various means for adjustable setpoint controls without undue experimentation.

With reference now to FIG. 12, an alternate design for bit detector 1052 is provided wherein dual detectors are used to analyze the same input signal. As mentioned before, this configuration is useful because the auxiliary detector can analyze extreme values of sampling timing and threshold level without impacting the live data traffic handled by the main detector.

In FIG. 12, several of the elements are present in complementary pairs and function in the same manner as the counterparts in FIG. 11. Briefly, comparators 1204 and 1206 are analogous to comparator 1104; latches 1220 and 1222 are analogous to latch 1120; adjustable stored threshold levels 1210 and 1206 are analogous to adjustable stored threshold level 1110; phase shifters 1230 and 1232 are analogous to clock phase shifter 1130; and detector setpoint controllers 1240 and 1242 are similar to detector setpoint controller 1140. A single clock recovery circuit 1202 provides a recovered clock signal in FIG. 12 and is similar to clock recovery circuit 1102 in FIG. 11.

The main detector within bit detector 1052 of FIG. 12 comprises comparator 1204, data latch 1220, adjustable stored threshold level 1210, and phase shifter 1230. The output of the main detector at data output 1060 carries live data traffic and fulfills the main purpose of detector 1052 in accomplishing communications through an optical link. Main detector setpoint controller 1240 is dedicated to maintaining optimum setpoint settings that minimize BER through the main detector circuitry. Main detector setpoint controller 1240 exercises control of main threshold level through control link 1235 and main sampling timing through control link 1234.

The auxiliary detector within bit detector 1052 of FIG. 12 comprises comparator 1206, data latch 1222, adjustable stored threshold level 1212, and phase shifter 1232. Common clock recovery circuit 1202 provides the necessary recovered clock signal to phase shifter 1232. Auxiliary latch output 1124 bears the bit decisions made by the auxiliary detector. Rather than use a duplicate SONET receiver to assess the BER of this signal, an exclusive-OR logic gate 1226 is employed to compare the output from main data latch 1220 to the auxiliary latch output 1124. The main detector will generally be operating at an optimum setpoint and for practical purposes can assumed to be an error-free output, especially in comparison to the auxiliary latch output.

The output of exclusive OR logic gate 1226 is applied to the input of a pulse counter 1228 which serves to total the number of instances that auxiliary latch output 1124 disagrees with main output 1060.

Auxiliary detector setpoint controller 1242 may reset pulse counter 1228 to zero through reset line 1244 and may read a cumulative count from pulse counter 1228 through count output 1246. Auxiliary detector setpoint controller 1242 exercises control of the auxiliary threshold level through control link 1237 and control of the auxiliary sampling timing through control link 1236. Auxiliary detector setpoint controller 1242 may adjust the threshold and sampling timing of the auxiliary detector while using counter 1228 to monitor the resulting occurrence of bit errors. Auxiliary detector setpoint controller 1242 may therefore perform an analysis of input signal quality and derive a signal quality indicator 1062.

In FIG. 12, bit error rate information from SONET receiver 1070 along BER output 1076 is made available to main and auxiliary detector setpoint controllers. Real time BER information may be useful to main detector setpoint controller 1240 for active control of the main detector setpoint. Real time BER information may be useful to auxiliary detector setpoint controller 1242 to suspend analysis when the main detector cannot achieve adequate signal performance to enable valid measurements by the auxiliary detector.

Figure 13:
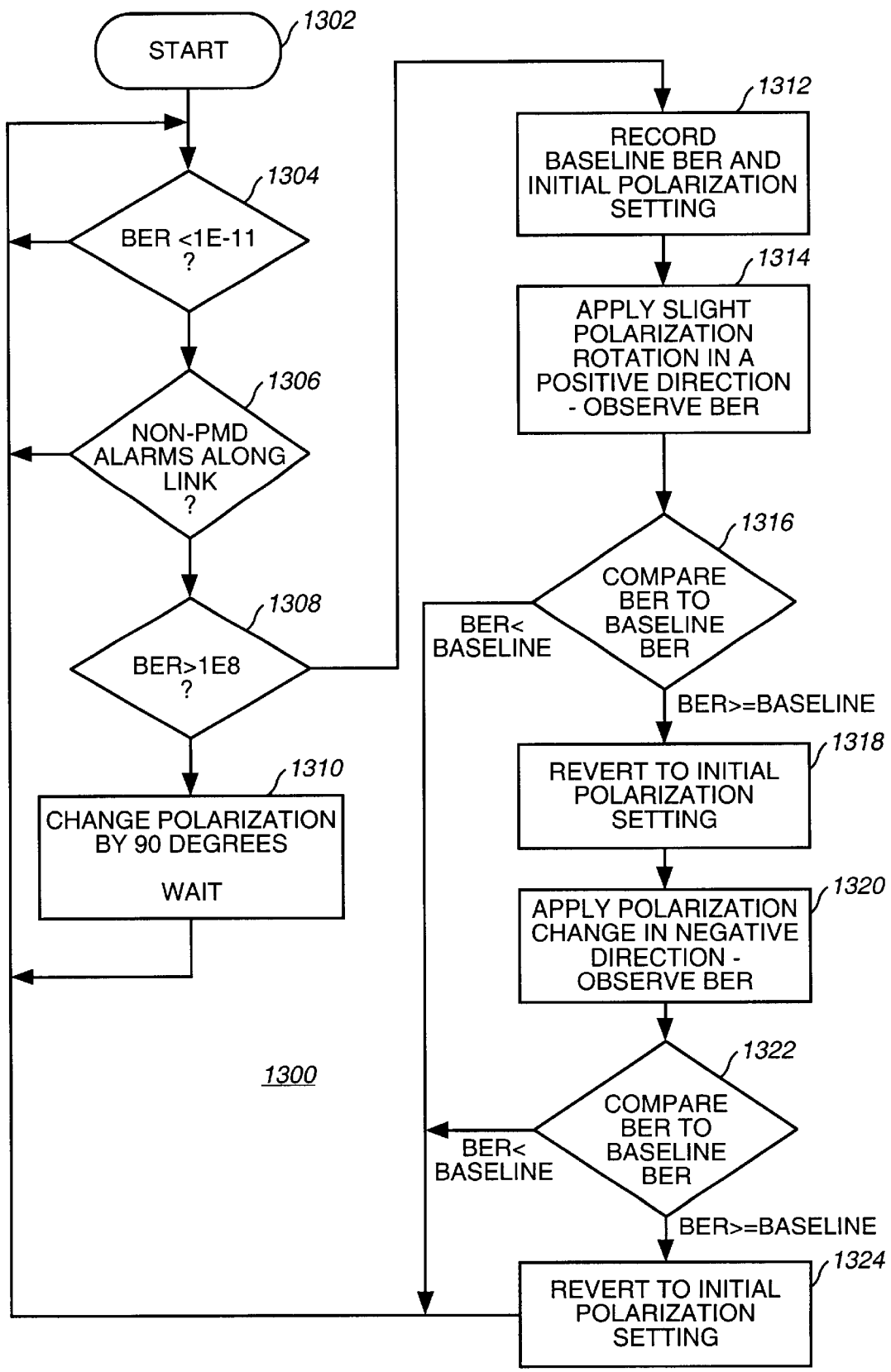
FIG. 13 is a flowchart depicting the process by which bit error rate of a data signal is monitored by a receiver and, in response, commands are issued to a polarization controller to achieve desired signal quality.

FIG. 13 describes the process by which bit detector 1050 and polarization control coordinator 1092 collectively act to assess the quality of forward optical signal 1024 and decide the action that should be taken by polarization controller 1010. In particular, the process of FIG. 13 relates to one aspect of the present invention wherein signal quality indicator 1062 is simply the BER of the input signal as observed by SONET receiver 1070.

Process 1300 begins at step 1302 upon powering up and initializing all of the elements associated with transmission and PMD control of an optical signal. When all such elements are ready to accomplish transmission and PMD control then a continuous control loop is started by execution of step 1304.

In step 1304, the BER received from a SONET receiver is compared to a preset action threshold, such as $10^{-11}$. If the BER is better than this value, the performance of the link is deemed acceptable without adjustment of the polarization controller and no further action is taken. Execution simply loops back to step 1304 to continue comparing the BER against the action threshold. If, in step 1304, the BER is ever found to be above the preset action threshold, then execution proceeds to step 1306 to determine if there are currently any fault alarms indicating that a non-PMD problem is affecting the optical link. If so, then execution returns to step 1304 and no further PMD-related corrective actions are performed.

If, in step 1306, no fault alarms are active for the link, then execution proceeds to step 1308 to assess the severity of the BER. In step 1308, the BER is compared to a preset severity threshold. If the BER is higher than the severity threshold, then a radical polarization change is ordered in step 1310, a temporary wait state is entered to allow for system, settling time, and then execution loops back to step 1304. This process is undertaken to more quickly correct the link when degradation is severe.

If, in step 1308, the BER is below the severity threshold, then execution moves to step 1312 wherein a baseline BER and initial relative polarization setting are noted. Then, in step 1314, the polarization controller is commanded to change the polarization rotation by a small amount in one direction, arbitrarily called a positive direction.

Following this change, the BER is observed for a time and then, in step 1316, the BER after the polarization change is compared to the baseline BER noted before the polarization change. If, in step 1316, the new BER is better (lower) than the baseline BER, then the polarization adjustment performed in step 1314 remains in effect and execution returns to step 1304. Otherwise, if step 1316 determines that the new BER is equal to or worse than the baseline BER, then in step 1318, the polarization change caused in step 1314 is removed by instructing the polarization controller to return to the initial polarization setting noted in step 1312.

After returning the polarization controller to its initial setting in step 1318, the polarization is made to change slightly in an opposite direction compared to the change made in step 1314. Again, the BER is observed for a time and then, in step 1322, the new BER is compared to the baseline BER noted in step 1312. If, in step 1322, the new BER is better (lower) than the baseline BER, then the negative polarization change performed in step 1320 is allowed to remain and execution returns to step 1304.

If, in step 1322, the new BER is equal to or worse than the baseline BER, then execution proceeds to step 1324 wherein the polarization controller is returned to its initial state noted in step 1312. After resetting the polarization controller in step 1312, execution returns to step 1304 and the PMD control loop is perpetuated.

Figure 14:
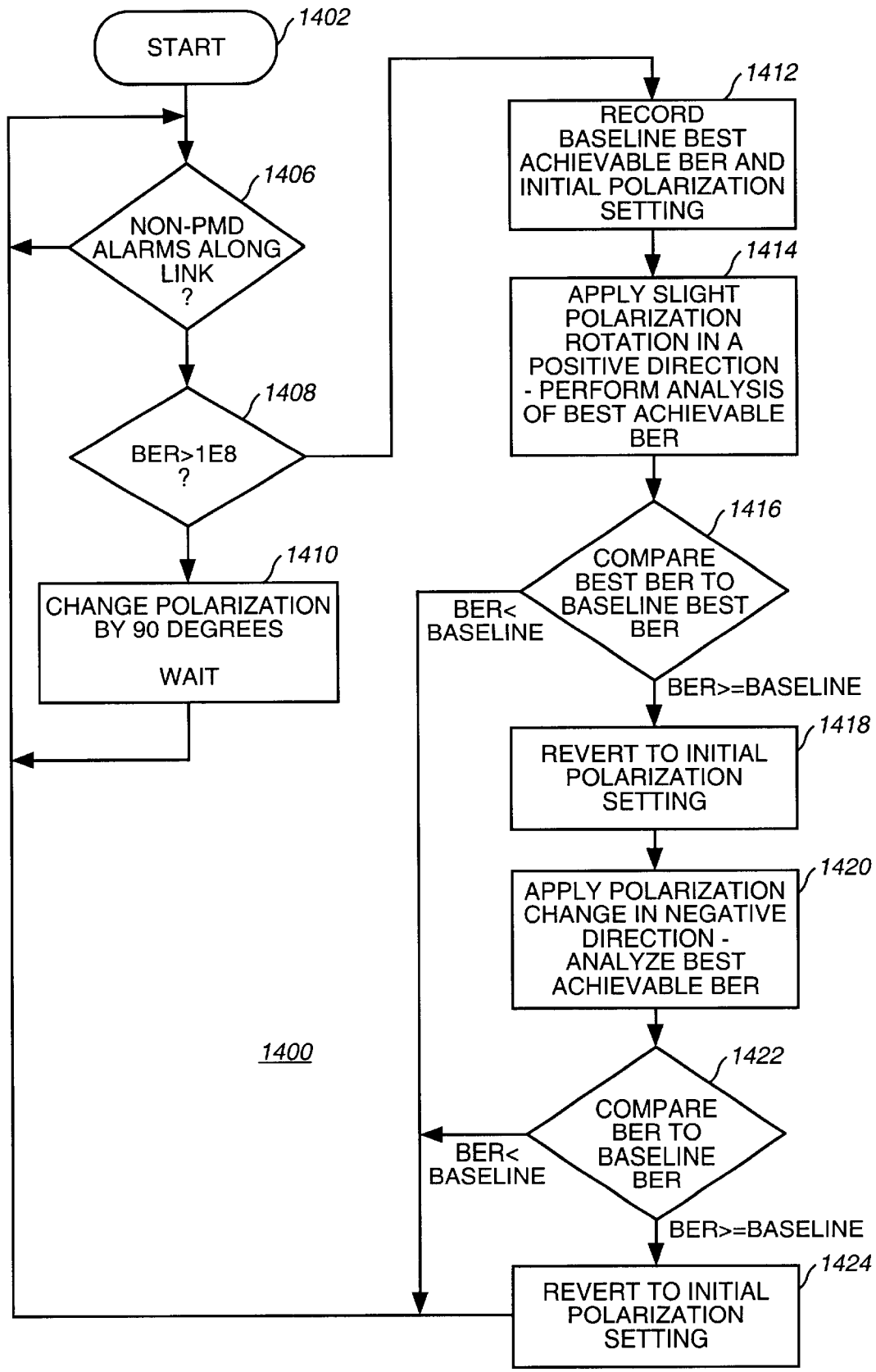
FIG. 14 is a flowchart depicting the process by which the best attainable bit error rate of a data signal is estimated by a receiver and, in response, commands are issued to a polarization controller to achieve desired signal quality.

FIG. 14 describes an alternative process by which bit detector 1050 and polarization control coordinator 1092 may collectively act to assess the quality of forward optical signal 1024 and decide the action that should be taken by polarization controller 1010. In particular, the process of FIG. 14 relates to one aspect of the present invention wherein signal quality indicator 1062 is an estimate of the best achievable BER of the input signal based on the analysis technique that was described earlier in conjunction with FIG. 7.

Process 1400 begins at step 1402 upon powering up and initializing all of the elements associated with transmission and PMD control of an optical signal. When all such elements are ready to accomplish transmission and PMD control then a continuous control loop is started by execution of step 1406.

Step 1406 is executed to determine if there are currently any fault alarms indicating that a non-PMD problem is affecting the optical link. If so, then execution returns to step 1404 and no further PMD-related corrective actions are performed.

If, in step 1406, no fault alarms are active for the link, then execution proceeds to step 1408 to assess the severity of the BER. In step 1408, the BER is compared to a preset severity threshold. If the BER is higher than the severity threshold, then a-radical polarization change is ordered in step 1410, a temporary wait state is entered to allow for system settling time, and then execution loops back to step 1404. This process is undertaken to more quickly correct the link when degradation is severe.

If, in step 1408, the BER is below the severity threshold, then execution moves to step 1412 wherein a baseline BER and initial relative polarization setting are noted.

Then, in step 1414, the polarization controller is commanded to change the polarization rotation by a small amount in one direction, arbitrarily called a positive direction.

Following this change, the BER is observed for a time and then, in step 1416, the BER after the polarization change is compared to the baseline BER noted before the polarization change. If, in step 1416, the new BER is better (lower) than the baseline BER, then the polarization adjustment performed in step 1414 remains in effect and execution returns to step 1404. Otherwise, if step 1416 determines that the new BER is equal to or worse than the baseline BER, then in step 1418, the polarization change caused in step 1414 is removed by instructing the polarization controller to return to the initial polarization setting noted in step 1412.

After returning the polarization controller to its initial setting in step 1418, the polarization is made to change slightly in an opposite direction compared to the change made in step 1414. Again, the BER is observed for a time and then, in step 1422, the new BER is compared to the baseline BER noted in step 1412. If, in step 1422, the new BER is better (lower) than the baseline BER, then the negative polarization change performed in step 1420 is allowed to remain and execution returns to step 1404.

If, in step 1422, the new BER is equal to or worse than the baseline BER, then execution proceeds to step 1424 wherein the polarization controller is returned to its initial state noted in step 1412. After resetting the polarization controller in step 1412, execution returns to step 1404 and the PMD control loop is perpetuated.

Figure 15:
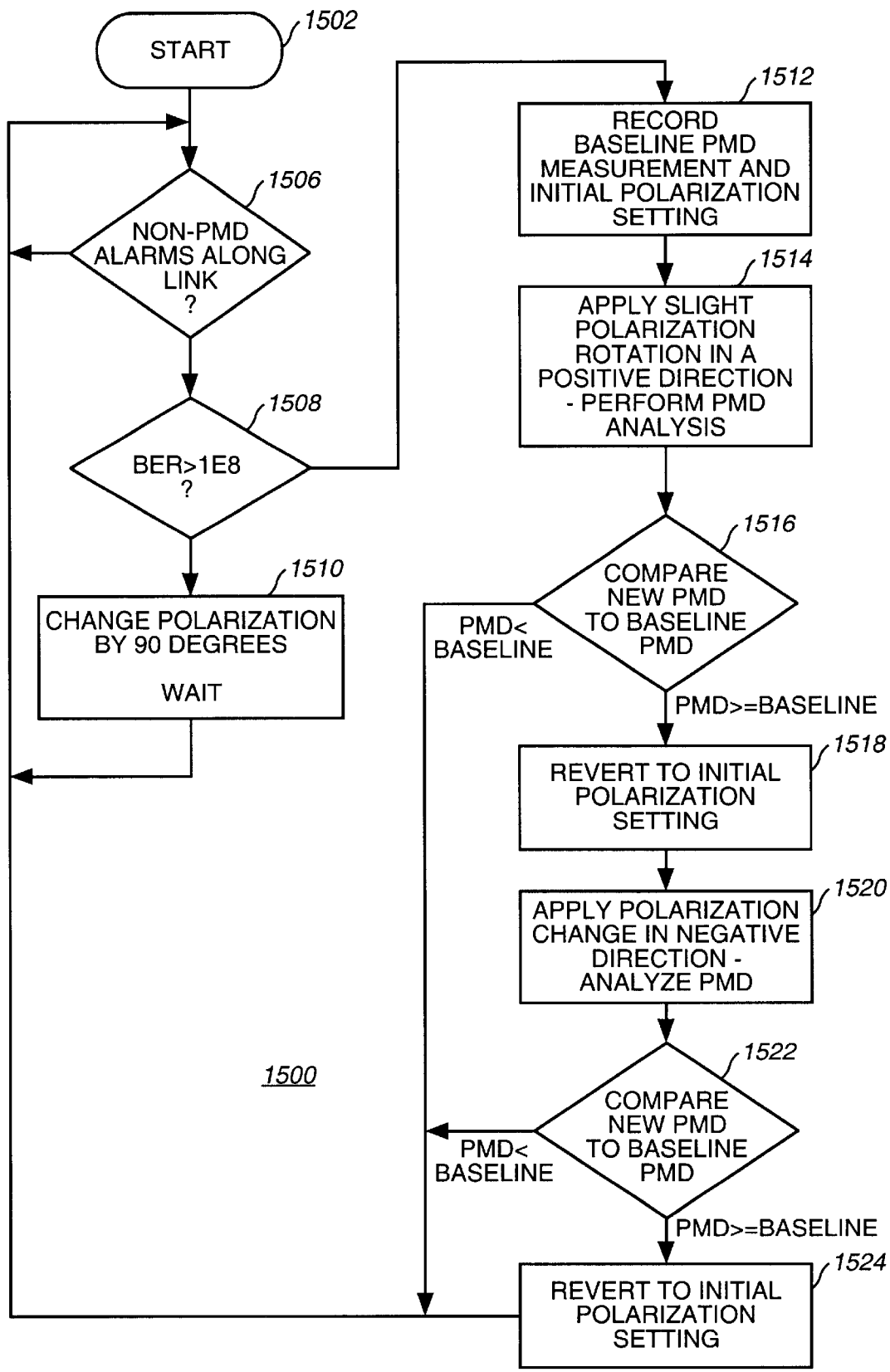
FIG. 15 is a flowchart depicting the process by which polarization mode dispersion of data signal is measured by a receiver and, in response, commands are issued to a polarization controller to achieve desired signal quality.

FIG. 15 describes yet another process by which bit detector 1050 and polarization control coordinator 1092 collectively act to assess the quality of forward optical signal 1024 and decide the action that should be taken by polarization controller 1010.

In particular, the process of FIG. 15 relates to one aspect of the present invention wherein signal quality indicator 1062 is derived by analyzing the input signal for multiple pulse components as earlier described in conjunction with FIG. 8 and FIG. 9.

Process 1500 begins at step 1502 upon powering up and initializing all of the elements associated with transmission and PMD control of an optical signal. When all such elements are ready to accomplish transmission and PMD control then a continuous control loop is started by execution of step 1506.

Step 1506 is performed to determine if there are currently any fault alarms indicating that a non-PMD problem is affecting the optical link. If so, then execution returns to step 1504 and no further PMD-related corrective actions are performed.

If, in step 1506, no fault alarms are active for the link, then execution proceeds to step 1508 to assess the severity of the BER. In step 1508, the BER is compared to a preset severity threshold. If the BER is higher than the severity threshold, then a radical polarization change is ordered in step 1510, a temporary wait state is entered to allow for system settling time, and then execution loops back to step 1504. This process is undertaken to more quickly correct the link when degradation is severe.

If, in step 1508, the BER is below the severity threshold, then execution moves to step 1512 wherein a baseline BER and initial relative polarization setting are noted. Then, in step 1514, the polarization controller is commanded to change the polarization rotation by a small amount in one direction, arbitrarily called a positive direction.

Following this change, the BER is observed for a time and then, in step 1516, the BER after the polarization change is compared to the baseline BER noted before the polarization change. If, in step 1516, the new BER is better (lower) than the baseline BER, then the polarization adjustment performed in step 1514 remains in effect and execution returns to step 1504. Otherwise, if step 1516 determines that the new BER is equal to or worse than the baseline BER, then in step 1518, the polarization change caused in step 1514 is removed by instructing the polarization controller to return to the initial polarization setting noted in step 1512.

After returning the polarization controller to its initial setting in step 1518, the polarization is made to change slightly in an opposite direction compared to the change made in step 1514. Again, the BER is observed for a time and then, in step 1522, the new BER is compared to the baseline BER noted in step 1512. If, in step 1522, the new BER is better (lower) than the baseline BER, then the negative polarization change performed in step 1520 is allowed to remain and execution returns to step 1504.

If, in step 1522, the new BER is equal to or worse than the baseline BER, then execution proceeds to step 1524 wherein the polarization controller is returned to its initial state noted in step 1512. After resetting the polarization controller in step 1512, execution returns to step 1504 and the PMD control loop is perpetuated.

While the invention has been shown and described in the context of exemplary embodiments, a person of ordinary skill in the relevant art will readily recognize that many variations are possible without deviating from the spirit and scope of the invention. For example, the PMD control coordinator may be collocated with a transmitter or polarization controller or may be located at some intermediate or remote location. The collective functions described for bit detector 1052, PMD control coordinator 1092, and polarization command receiver 1088 may be integrated or distributed differently among these elements.

Even though, for clarity, the exemplary embodiment of FIG. 7 emphasizes PMD control only being applied in one direction through a fiber, it is readily apparent how such PMD control may be applied in a complementary fashion to optical signals travelling in either direction through a common fiber.

Furthermore, whereas the description uses SONET-compliant high data rate signals for examples, it should apparent that other high data rate formats are equally amenable to the practice of the invention, such as the Synchronous Digital Hierarchy(SDH) prevalent in many parts of the world. The present invention is independent of the high data rate format used.

The present invention should not be construed to be limited by any of the exemplary embodiments shown, but rather should be interpreted by the following claims.

What is claimed is:

1. A method for active control of polarization-dependent impairments in an optical communications link comprising the steps of:

coupling a first modulated optical signal from an optical transmitter into an optical fiber;

applying an adjustable polarization control means to the first modulated optical signal at a point substantially near the optical transmitter;

receiving the first modulated optical signal through the optical fiber at a receiver;

deriving a signal quality indicator by measuring the quality of the first modulated optical signal received at the receiver, wherein the deriving is based on the measured quality of the first modulated optical signal as a function of varying the sampling timing and threshold level of a bit detector in the receiver;

in response to the signal quality indicator, deciding changes in the settings of the adjustable polarization control means that will improve the quality of the received first modulated optical signal; and sending polarization control commands to the polarization control means to change the polarization state of the first modulated optical signal to improve the quality of the first modulated optical signal received at the receiver.

2. The method of claim 1 wherein the signal quality indicator is derived from a bit error rate of the first modulated optical signal measured at the receiver.

3. The method of claim 1 wherein the signal quality indicator is derived from an estimate of eye diagram signal quality obtained by varying the threshold level of a bit detector in the receiver while monitoring resultant changes in bit error rate.

4. The method of claim 1 wherein the signal quality indicator is derived from an estimate of eye diagram signal quality obtained by varying the sampling timing of a bit detector in the receiver while monitoring resultant changes in bit error rate.

5. The method of claim 1 wherein the signal quality indicator is derived from an estimate of eye diagram signal quality obtained by varying the sampling timing and threshold level of a bit detector in the receiver while monitoring resultant changes in bit error rate.

6. The method of claim 1 wherein the polarization control commands are sent to the polarization controller along the same optical fiber through which the first modulated optical signal is propagated from the transmitter to the receiver.

7. The method of claim 1 wherein the polarization control commands are sent to the polarization controller as modulation upon a second modulated optical signal that is propagating along the same fiber as the first modulated optical signal but in a propagation direction opposite that of the first modulated optical signal.

8. The method of claim 1 wherein the polarization control commands are sent to the polarization controller as a subcarrier modulation superimposed upon a second modulated optical signal that is propagating along the same fiber as the first modulated optical signal but in a propagation direction opposite that of the first modulated optical signal.

9. The method of claim 1 wherein the polarization control commands are sent to the polarization controller as a subcarrier modulation superimposed upon a second modulated optical signal that is propagating along the same fiber as the first modulated optical signal but in a propagation direction opposite that of the first, modulated optical signal, the subcarrier modulation having substantially lower bandwidth than the modulation applied to the first modulated optical signal.

10. An optical communications link having active control of polarization-dependent impairments comprising:

an optical fiber, having first and second ends, for carrying optical signals in either direction between the first end and second end;

an optical transmitter coupled to the first end of the optical fiber, the optical transmitter producing a first modulated optical signal that is carried through the optical fiber to the second end;

an optical receiver coupled to the second end of the optical fiber for receiving the first modulated optical signal, the optical receiver comprising means for deriving a measurement of reception quality of the first modulated optical signal, wherein deriving the measurement of reception quality is based on varying the sampling timing and the threshold level of a bit detector in the receiver;

a polarization controller interposed in the optical path between the transmitter and receiver the affects the polarization state of the first modulated optical signal in response to polarization control commands; and a polarization control coordinator coupled to the receiver and coupled to the polarization controller for sending polarization control commands to the polarization controller responsive to the measurement of reception quality derived by the receiver.

11. The optical communications link of claim 10 wherein the measurement of reception quality is derived from the bit error rate of the first modulated optical signal observed at the receiver.

12. The optical communications link of claim 10 wherein the measurement of reception quality is derived from an estimate of eye diagram signal quality obtained by varying the threshold level of a bit detector in the receiver while monitoring resultant changes in bit error rate.

13. The optical communications link of claim 10 wherein the measurement of reception quality is derived from an estimate of eye diagram signal quality obtained by varying the sampling timing of a bit detector in the receiver while monitoring resultant changes in bit error rate.

14. The optical communications link of claim 10 wherein the measurement of reception quality is derived from an estimate of eye diagram signal quality obtained by varying the sampling timing and threshold level of a bit detector in the receiver while monitoring resultant changes in bit error rate.

15. The optical communications link of claim 10 wherein the polarization control commands are sent to the polarization controller along the same optical fiber through which the first modulated optical signal is propagated from the transmitter to the receiver.

16. The optical communications link of claim 10 wherein the polarization control commands are sent to the polarization controller as modulation upon a second modulated optical signal that is propagating along the same fiber as the first modulated optical signal but in a propagation direction opposite that of the first modulated optical signal.

17. The optical communications link of claim 10 wherein the polarization control commands are sent to the polarization controller as a subcarrier modulation superimposed upon a second modulated optical signal that is propagating along the same fiber as the first modulated optical signal but in a propagation direction opposite that of the first modulated optical signal.

18. The optical communications link of claim 10 wherein the polarization control commands are sent to the polarization controller as a subcarrier modulation superimposed upon a second modulated optical signal that is propagating along the same fiber as the first modulated optical signal but in a propagation direction opposite that of the first modulated optical signal, the subcarrier modulation having substantially lower bandwidth than the modulation applied to the first modulated optical signal.

19. A method for active control of polarization-dependent impairments in an optical communications link comprising the steps of:

coupling a first modulated optical signal from an optical transmitter into an optical fiber;

applying an adjustable polarization control means to the first modulated optical signal at a point substantially near the optical transmitter;

receiving the first modulated optical signal through the optical fiber at a receiver;

measuring the quality of the first modulated optical signal received at the receiver;

deriving a signal quality indicator by varying signal threshold levels to bit error rate values and using those bit error rate values to extrapolate at low bit error rate values a signal threshold level resulting in the best achievable bit error rate;

in response to the signal quality indicator, deciding changes in the settings of the adjustable polarization control means that will improve the quality of the received first modulated optical signal; and sending polarization control commands to the polarization control means to change the polarization state of the first modulated optical signal to improve the quality of the first modulated optical signal received at the receiver.

20. A method for active control of polarization-dependent impairments in an optical communications link comprising the steps of:

coupling a first modulated optical signal from an optical transmitter into an optical fiber;

applying an adjustable polarization control means to the first modulated optical signal at a point substantially near the optical transmitter;

receiving the first modulated optical signal through the optical fiber at a receiver;

measuring the quality of the first modulated optical signal received at the receiver;

deriving a signal quality indicator by varying the sample timing interval to determine bit error rate values and using those bit error rate values to extrapolate, at low bit error rate values, a sample timing interval resulting in the best achievable bit error rate;

in response to the signal quality indicator, deciding changes in the settings of the adjustable polarization control means that will improve the quality of the received first modulated optical signal; and sending polarization control commands to the polarization control means to change the polarization state of the first modulated optical signal to improve the quality of the first modulated optical signal received at the receiver.

21. A method for active control of polarization-dependent impairments in an optical communications link comprising the steps of:

coupling a first modulated optical signal from an optical transmitter into an optical fiber;

applying an adjustable polarization control means to the first modulated optical signal at a point substantially near the optical transmitter;

receiving the first modulated optical signal through the optical fiber at a receiver;

measuring the quality of the first modulated optical signal received at the receiver;

deriving a signal quality indicator by varying signal threshold levels and sample timing intervals to determine bit error rate values and using those bit error rate values to extrapolate at low bit error rate levels the combination of signal threshold level and sample timing interval level setting resulting in the best achievable bit error rate;

in response to the signal quality indicator, deciding changes in the settings of the adjustable polarization control means that will improve the quality of the received first modulated optical signal; and sending polarization control commands to the polarization control means to change the polarization state of the first modulated optical signal to improve the quality of the first modulated optical signal received at the receiver.

* * * * *